(12) United States Patent
Giamati

(10) Patent No.: US 10,590,634 B2
(45) Date of Patent: Mar. 17, 2020

(54) PRESSURIZED POTABLE WATER SYSTEM WITH CONFORMAL SHAPE WATER STORAGE TANK

(71) Applicant: Goodrich Corporation, Charlotte, NC (US)

(72) Inventor: Michael John Giamati, Akron, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 69 days.

(21) Appl. No.: 15/071,860

(22) Filed: Mar. 16, 2016

(65) Prior Publication Data
US 2017/0268206 A1  Sep. 21, 2017

(51) Int. Cl.
| *E03B 11/08* | (2006.01) |
| *B67D 7/72* | (2010.01) |
| *B67D 7/62* | (2010.01) |
| *B67D 7/02* | (2010.01) |
| *B67D 7/36* | (2010.01) |
| *B64D 11/02* | (2006.01) |

(Continued)

(52) U.S. Cl.
CPC .............. *E03B 11/08* (2013.01); *B60R 15/02* (2013.01); *B60R 15/04* (2013.01); *B61D 35/00* (2013.01); *B64D 11/00* (2013.01); *B64D 11/02* (2013.01); *B64D 11/04* (2013.01); *B67D 7/0266* (2013.01); *B67D 7/36* (2013.01); *B67D 7/62* (2013.01); *B67D 7/72* (2013.01); *E03B 11/02* (2013.01); *E03B 2011/005* (2013.01); *Y02A 20/106* (2018.01)

(58) Field of Classification Search
CPC ...... E03B 7/07; E03B 11/08; E03B 2001/005; E03B 11/02; E03B 2011/005; B60R 15/02; B60R 15/04; B61D 35/002; B61D 35/005; B61D 35/00; B64D 11/00; B64D 11/02; B64D 11/04; B67D 7/0266; B67D 7/36; B67D 7/62; B67D 7/72
USPC .... 137/206, 209, 899.2; 222/1, 129, 394, 56
See application file for complete search history.

(56) References Cited

U.S. PATENT DOCUMENTS 3,788,343 A * 1/1974 Neidorf .................... B67D 1/04
                                                                137/209
3,995,328 A * 12/1976 Carolan ................ B64D 11/02
                                                                  4/316

(Continued)

FOREIGN PATENT DOCUMENTS

CN          201330438 Y      10/2009

OTHER PUBLICATIONS

European Search Report Issued in EP Application No. 17161260.9, dated Jul. 26, 2017, 10 Pages.

*Primary Examiner* — Paul R Durand
*Assistant Examiner* — Andrew P Bainbridge
(74) *Attorney, Agent, or Firm* — Cantor Colburn LLP

(57) ABSTRACT

A water supply system includes a water storage tank having a storage tank outlet, the water storage tank configured to store a volume of water at a first pressure. A pressure tank is in fluid communication with the water storage tank and is periodically fillable with water from the water storage tank. An air source is fluidly connected to the pressure tank to pressurize the volume of water in the pressure tank to a second pressure greater than the first pressure. A pressure tank output line is fluidly connected to the pressure tank to output water from the pressure tank.

17 Claims, 2 Drawing Sheets

(51) Int. Cl.
  *B60R 15/02* (2006.01)
  *B64D 11/00* (2006.01)
  *E03B 11/02* (2006.01)
  *B60R 15/04* (2006.01)
  *B64D 11/04* (2006.01)
  *B61D 35/00* (2006.01)
  *E03B 11/00* (2006.01)

(56) References Cited

U.S. PATENT DOCUMENTS

| | | | | |
|---|---|---|---|---|
| 4,063,315 A * | 12/1977 | Carolan | | B64D 11/02 4/216 |
| 4,871,452 A * | 10/1989 | Kohler | | B64D 11/02 210/167.3 |
| 5,261,440 A * | 11/1993 | Frank | | B64D 11/02 137/208 |
| 5,303,739 A * | 4/1994 | Ellgoth | | B64D 11/00 137/209 |
| 5,358,009 A * | 10/1994 | Cambell | | B67D 7/002 137/209 |
| 5,901,879 A * | 5/1999 | Duhaime | | G01F 11/284 222/1 |
| 5,992,684 A * | 11/1999 | Russell | | B67D 1/006 222/1 |
| 6,766,822 B2 * | 7/2004 | Walker | | E03B 7/04 137/365 |
| 7,947,164 B2 * | 5/2011 | Hoffjann | | B64D 11/02 205/742 |
| 2007/0069078 A1 | 3/2007 | Hoffjann et al. | | |
| 2007/0130684 A1 * | 6/2007 | Watts | | B60R 15/02 4/596 |
| 2008/0197147 A1 * | 8/2008 | Gruson | | B65B 3/14 222/61 |
| 2010/0116935 A1 * | 5/2010 | Rieger | | B64D 11/02 244/118.5 |
| 2013/0026195 A1 * | 1/2013 | Park | | C02F 1/001 222/394 |
| 2013/0298998 A1 * | 11/2013 | Nolan | | C02F 1/004 137/1 |
| 2014/0158242 A1 * | 6/2014 | Schreiner | | B64D 11/02 137/899.2 |
| 2016/0120118 A1 * | 5/2016 | Bouten | | A01M 7/0092 222/1 |

* cited by examiner

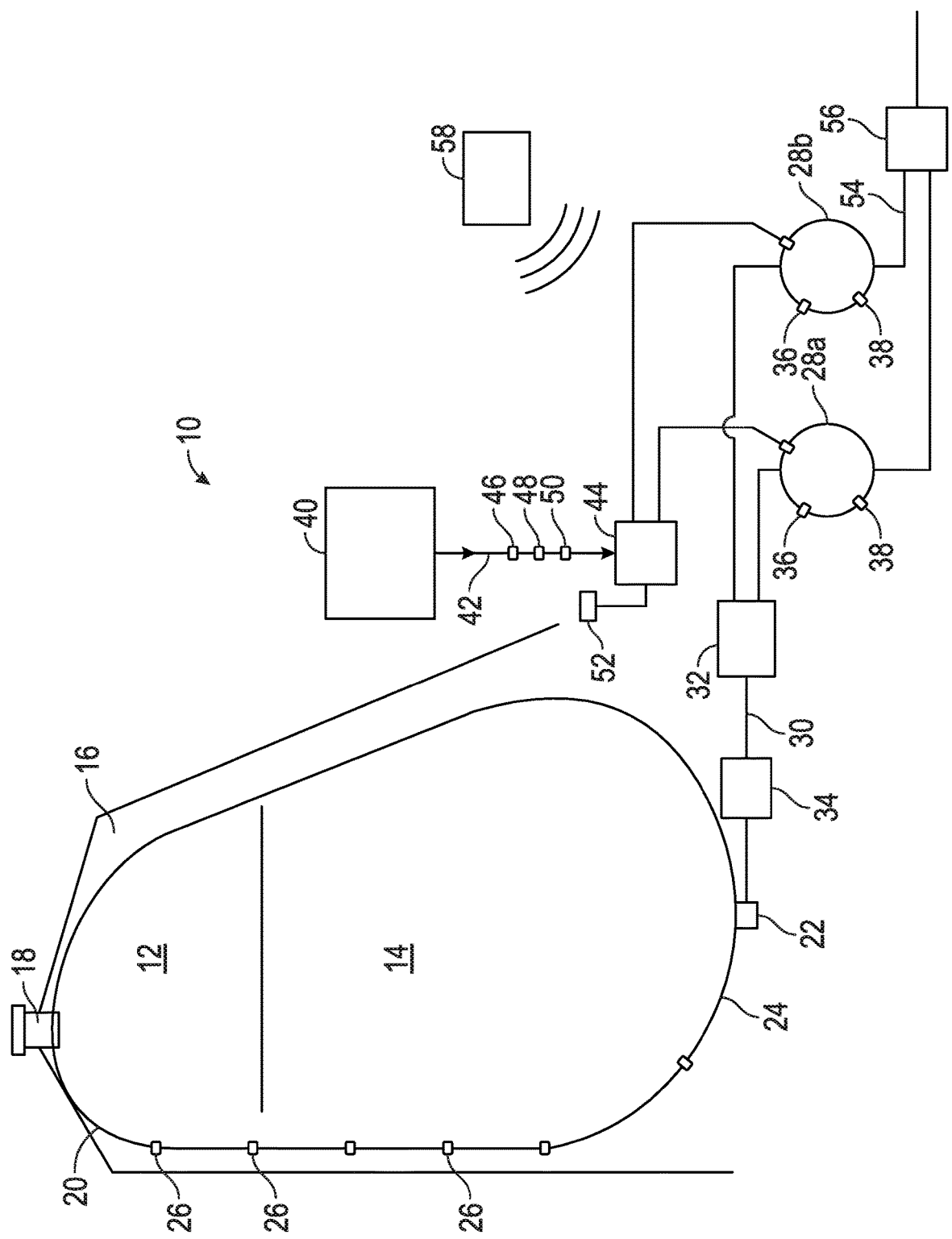

PRESSURIZED POTABLE WATER SYSTEM WITH CONFORMAL SHAPE WATER STORAGE TANK

BACKGROUND

The subject matter disclosed herein relates to water systems. More specifically, the present disclosure relates to potable water systems utilizing conformal-shaped water storage tanks.

Many applications, such passenger aircraft, passenger trains, or the like often include potable water systems to provide water for use by passengers during operation. In an aircraft, for example, some potable water systems include a large water storage tank which is pressurized with air. The air typically is bleed air from an auxiliary power unit or is provided by a standalone air compressor for the potable water system. Aircraft operators typically desire the tank to maximize water volume storage capability, while also minimizing interior aircraft space utilized by the water storage tank. For this reason, the water storage tank is often made to an irregular or conformal shape, meant to fit in an irregular-shaped space allotted for the water storage tank at the interior of the aircraft. When pressurized, however, it is difficult to maintain the conformal shape of the water storage tank as the pressure inside the tank attempts to force the tank into a spherical shape. As such, it is required to form the tank from high-strength pressure resistant materials, and it may also be necessary to include external and/or internal structural reinforcement or baffles to the tank to maintain the tank shape when the tank is pressurized. As a result, the water storage tank adversely affects the cost and weight of the potable water system.

SUMMARY

In one embodiment, a water supply system includes a water storage tank having a storage tank outlet, the water storage tank configured to store a volume of water at a first pressure. A pressure tank is in fluid communication with the water storage tank and is periodically fillable with water from the water storage tank. An air source is fluidly connected to the pressure tank to pressurize the volume of water in the pressure tank to a second pressure greater than the first pressure. A pressure tank output line is fluidly connected to the pressure tank to output water from the pressure tank.

Additionally or alternatively, in this or other embodiments the first pressure is substantially ambient pressure.

Additionally or alternatively, in this or other embodiments a level sensor is located at the pressure tank to detect when a water level in the pressure tank is such that the pressure tank is in need of refill.

Additionally or alternatively, in this or other embodiments the level sensor is operably connected to the water storage tank to initiate refill of the pressure tank from the water storage tank when the level sensor detects the pressure tank is in need of refill.

Additionally or alternatively, in this or other embodiments the pressure tank is two pressure tanks arranged in parallel and flow through the pressure tank output line is switchable between a first pressure tank of the two pressure tanks and a second pressure tank of the two pressure tanks.

Additionally or alternatively, in this or other embodiments an air valve is operably connected to the air source and the two pressure tanks to selectably admit pressurizing air to the first pressure tank and/or the second pressure tank.

Additionally or alternatively, in this or other embodiments a storage output valve is operably connected to the water storage tank and the two pressure tanks to selectably admit water into the first pressure tank and/or the second storage tank from the water storage tank.

Additionally or alternatively, in this or other embodiments a pump urges water from the water storage tank to the pressure tank.

Additionally or alternatively, in this or other embodiments the water storage tank is formed from one of a plastic or composite material.

Additionally or alternatively, in this or other embodiments the water storage tank is non-spherical and non-cylindrical.

Additionally or alternatively, in this or other embodiments the second pressure is in the range of 20-45 pounds per square inch.

In another embodiment, a method of operating a water supply system includes storing a volume of water at a first pressure at a water storage tank, urging a portion of the volume of water from the water storage tank into a first pressure tank, urging a volume of air from an air source into the first pressure tank to pressurize the first pressure tank to a second pressure greater than the first pressure, and releasing a flow of water from the first pressure tank via a pressure tank output line fluidly connected to the first pressure tank.

Additionally or alternatively, in this or other embodiments a water level at the first pressure tank is detected, and the first pressure tank is refilled from the water storage tank based on the detected water level.

Additionally or alternatively, in this or other embodiments a portion of the volume of water is urged from the water storage tank into a second pressure tank arranged in parallel with the first pressure tank. A volume of air is urged from the air source into the second pressure tank to pressurize the second pressure tank to a second pressure greater than the first pressure. A flow of water is selectably released from the first pressure tank and/or the second pressure tank via a pressure tank output line fluidly connected to the first pressure tank and the second pressure tank.

Additionally or alternatively, in this or other embodiments the first pressure tank and/or the second pressure tank are selectably filled from the water storage tank through operation of a storage output valve operably connected to the first pressure tank and the second pressure tank.

Additionally or alternatively, in this or other embodiments the first pressure tank and/or the second pressure tank are selectably pressurized through operation of an air valve operably connected to the air source, first pressure tank and second pressure tank.

Additionally or alternatively, in this or other embodiments water is urged from the water storage tank via a pump.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2 is a schematic view of another embodiment of a potable water system.

DETAILED DESCRIPTION

Figure 1:
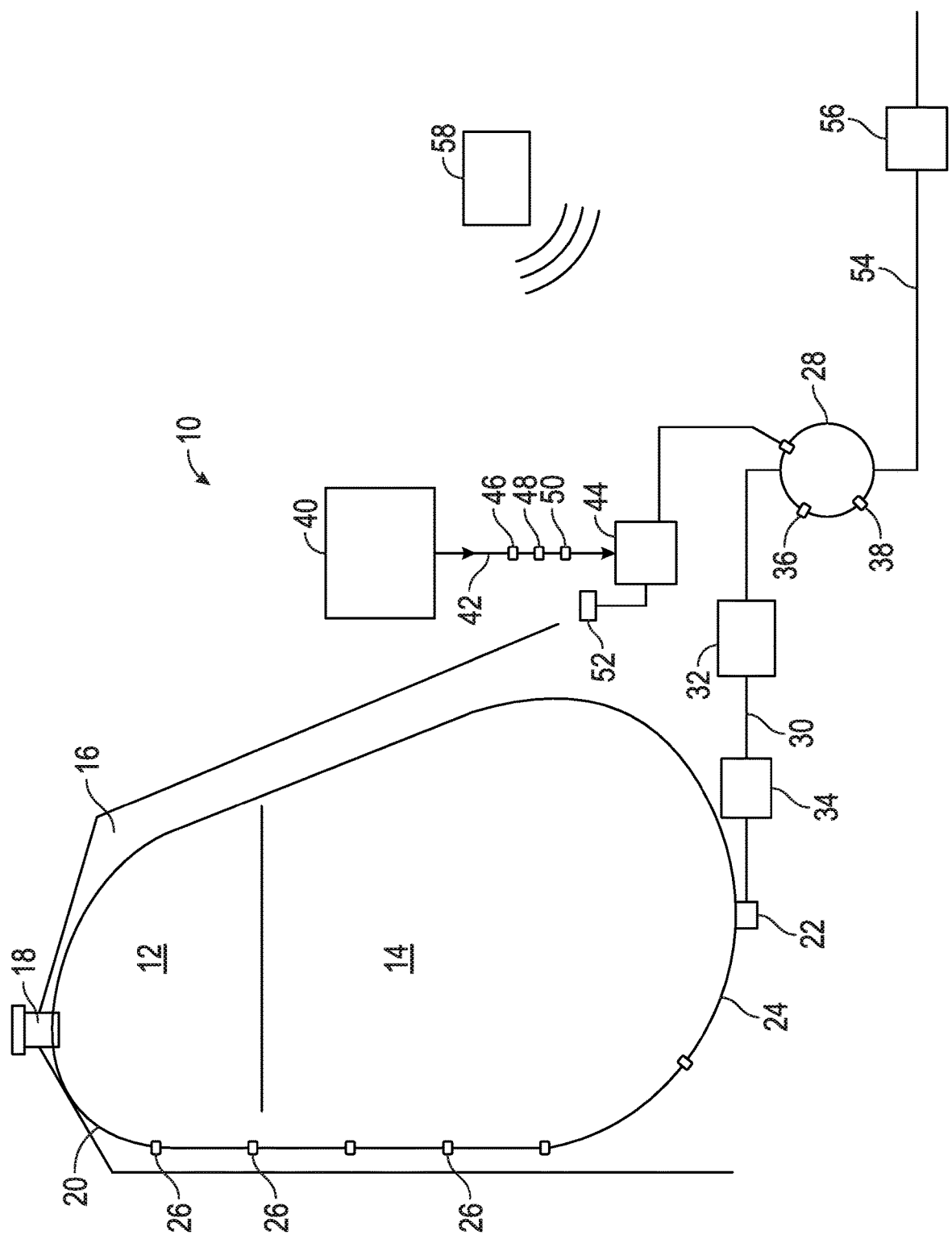
FIG. 1 is a schematic view of an embodiment of a potable water system.

Referring now to FIG. 1, shown is an exemplary embodiment of potable water system (PWS) 10 for use in, for example, a passenger aircraft cabin. The PWS 10 includes a water storage tank 12, configured to contain a volume of water 14 or other fluid at ambient pressure, or at about 1 atmosphere. The water storage tank 12 is not constructed as a pressure vessel. In some embodiments, the water storage tank 12 may have an interior volume of between 10 and 30 gallons. The water storage tank 12 may be of a substantially uniform shape, such as a cylinder, or as shown in FIG. 1 may be irregularly-shaped to fit or conform to an aircraft space 16 in which the water storage tank 12 is located. Since it is not configured as a pressure vessel, the water storage tank 12 may be formed from relatively low strength materials, such as lightweight metals, plastic, composite or rubber materials. Further, because the water storage tank 12 is not constructed as a pressure vessel, it may be formed without internal baffles or internal or external ribs for strength, thereby simplifying construction of the water storage tank 12 and reducing its cost compared to an equivalently-sized pressure vessel.

The water storage tank 12 includes a storage tank fill port 18, in some embodiments located at an uppermost tank surface 20. The water storage tank 12 further includes a storage tank outlet 22, in some embodiments located at a lowermost tank surface 24. Further, the water storage tank 12 may include one or more storage tank level sensors 26, to detect a level of the water volume 14 inside the water storage tank 12.

The water storage tank 12 is connected to a pressure tank 28 via a storage tank output line 30. In some embodiments, the pressure tank 28 is a pressure vessel configured to hold a volume of between one quart and one gallon of water at any one time. The flow of water through the storage tank output line 30 from the water storage tank 12 to the pressure tank 28 may be controlled by a storage output valve 32 located along the storage tank output line 30. While in the embodiment of FIG. 1, it is located along the storage tank output line, it is to be appreciated that in other embodiments the storage output valve 32 may be positioned elsewhere, for example, at the water storage tank 12 or at the pressure tank 28. Flow of water from the water storage tank 12 and the pressure tank 28 may be achieved through gravity if, for example, the storage tank outlet 22 is at a higher elevation that the pressure tank 28, or may be achieved via a motorized pump 34 which may be located, for example, a submersible pump located inside of the water storage tank 12 or may be located along storage tank output line 30. The pressure tank 28 further includes one or more level sensors, for example a full level sensor 36 that indicates when pressure tank 28 is full of water, and a refill level sensor 38 that indicates when the water level in the pressure tank 28 is at a level such that it should be refilled from the water storage tank 12.

The pressure tank 28 is pressurized to a pressure above ambient, or above 1 atmosphere through the introduction of air pressure from an air source 40. The air source may be, for example, bleed air from an aircraft engine or auxiliary power unit compressor (not shown). The air flow is urged from the air source 40 along an air line 42 and into the pressure tank 28, under the control of an air valve 44 located along the air line 42. Further components, such as an air pressure regulator 46 to control the air pressure entering the air line 42, a check valve 48 to protect the air line 42 from reversing flow, and an air filter 50 to remove contaminants from the air, may also be located along the air line 42. A vent 52 is connected to the air valve 44 to allow for venting air from the pressure tank 28 to reduce the pressure in the pressure tank 28. The pressure tank 28 is connected to a pressure tank output line 54 through a water valve 56 to provide a pressurized water supply upon request.

At initial start-up of the PWS 10, the water storage tank 12 is filled with the water volume 14, controller 58 reads the level sensors 36, 38 at the pressure tank 28 and determines that pressure tank 28 needs to be refilled. Storage output valve 32 is opened and the pressure tank 28 is filled until level sensor 36 indicates a full condition. Once pressure tank 28 is filled, storage output valve 32 is closed and air valve 44 is opened, providing air pressure to pressure tank 28 which is pressurized to the selected pressure. In some embodiments, the selected pressure of the pressure tank 28 is in the range of about 20 to 45 pounds per square inch (psi). In operation, water valve 56 is opened allowing the flow of water from pressure tank 28 as needed. When the water level in pressure tank 28 reaches refill level sensor 38, indicating need for a refill of pressure tank 28, water valve 56 is closed, and air valve 44 is switched to a vent position, allowing the air from pressure tank 28 to proceed through vent 52. Storage output valve 32 is opened to refill pressure tank 28 with water from water storage tank 12 and then closed to stop the flow of water from the water storage tank 12 when the water in the pressure tank 28 reaches a selected level. The pressure tank 28 is then re-pressurized via air valve 44 and air line 42. Once refilled and re-pressurized, water valve 56 is opened, allowing for the use of water from pressure tank 28.

During the time pressure tank 28 is vented, refilled and re-pressurized, the water supply will be unavailable for use. Alternatively, additional level sensors may be utilized in pressure tank 28 to refill the pressure tank 28 before it is fully emptied. Additionally, as shown in FIG. 2, seamless continuous operation of the PWS 10 may be achieved by adding one or more additional pressure tanks 28.

Referring to FIG. 2, the embodiment shown includes two pressure tanks, 28a and 28b. It is to be appreciated, however, that other embodiments may include three or more pressure tanks 28. Storage output valve 32 has four positions: fully closed, open to both pressure tank 28a and pressure tank 28b, open to pressure tank 28a and closed to pressure tank 28b, and open to pressure tank 28b and closed to pressure tank 28a. Alternatively, individual storage output valves 32 may be utilized. The air valve 44 and water valve 56 similarly have multiple operating positions.

Initial startup operation is similar to the embodiment of FIG. 1, except that both pressure tanks 28a and 28b are filled by actuation of storage output valve 32 and pressurized via the air valve 44 and air line 42. The pressure tanks 28a and 28b may be filled and pressurized either simultaneously with each other, or one after another. In operation, water is initially drawn off of one pressure tank, for example pressure tank 28a, for use by actuation of water valve 56. When the level sensor 38 of pressure tank 28b indicates a need to refill pressure tank 28a, controller 58 switches water valve 56 to draw off pressure tank 28b, instead of pressure tank 28a. Air valve 44 is switched to vent pressure tank 28a and storage output valve 32 is switched to allow water to fill pressure tank 28a. Once pressure tank 28a is refilled, storage output valve 32 is closed and air valve 44 is operated to pressurize pressure tank 28a. When pressure tank 28b reaches an empty level, a similar process is used to refill pressure tank 28b while water is drawn from pressure tank 28a for use. This process may be repeated as needed until water volume 14 in water storage tank 12 is depleted.

The potable water system 10 disclosed herein allows for lower cost and lower weight conformal water storage tank because there is no need for pressurization of the water storage tank, since the pressurization is performed at smaller pressure tanks downstream of the water storage tank. Further, in some embodiments, uninterrupted operation of the potable water system is provided by switching between two or more pressure tanks.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A water supply system, comprising:
   a water storage tank having a storage tank fill port and storage tank outlet, the water storage tank configured to store a volume of water at a first pressure;
   a pressure tank in fluid communication with the water storage tank and periodically fillable with water from the water storage tank by opening of a storage output valve disposed along a storage tank output line connecting the water storage tank to the pressure tank; and
   an air source fluidly connected to the pressure tank to pressurize the volume of water in the pressure tank to a second pressure greater than the first pressure when the storage output valve is in a closed position;
   a pressure tank output line fluidly connected to the pressure tank to output water from the pressure tank; and
   a vent line operably connected to the pressure tank to selectably vent pressure from the pressure tank to allow for refilling of the pressure tank from the water storage tank when the storage output valve is opened;
   wherein the storage tank outlet is disposed vertically above a pressure tank inlet disposed at an uppermost extent of the pressure tank, such that the volume of water is flowed from the water storage tank to the pressure tank via gravity;
   wherein the storage tank fill port is disposed at an uppermost tank surface of the water storage tank.

2. The water supply system of claim 1, wherein the first pressure is substantially ambient pressure.

3. The water supply system of claim 1, further comprising a level sensor disposed at the pressure tank to detect when a water level in the pressure tank is such that the pressure tank is in need of refill.

4. The water supply system of claim 3, wherein the level sensor is operably connected to the water storage tank to initiate refill of the pressure tank from the water storage tank when the level sensor detects the pressure tank is in need of refill.

5. The water supply system of claim 1, wherein the pressure tank is two pressure tanks arranged in parallel and flow through the pressure tank output line is switchable between a first pressure tank of the two pressure tanks and a second pressure tank of the two pressure tanks.

6. The water supply system of claim 5, further comprising an air valve operably connected to the air source and the two pressure tanks, to selectably admit pressurizing air to the first pressure tank and/or the second pressure tank.

7. The water supply system of claim 5, wherein the storage output valve is operably connected to the two pressure tanks to selectably admit water into the first pressure tank and/or the second storage tank from the water storage tank.

8. The water supply system of claim 1, further comprising a pump to urge water from the water storage tank to the pressure tank.

9. The water supply system of claim 1, wherein the water storage tank is formed from one of a plastic or composite material.

10. The water supply system of claim 1, wherein the water storage tank is non-spherical and non-cylindrical.

11. The water supply system of claim 1, wherein the second pressure is in the range of 20-45 pounds per square inch.

12. A method of operating a water supply system, comprising:
    storing a volume of water at a first pressure at a water storage tank, the water storage tank including a storage tank fill port disposed at an uppermost tank surface of the water storage tank;
    urging a portion of the volume of water from the water storage tank into a first pressure tank via gravity by opening of a storage output valve disposed along a storage tank output line connecting the water storage tank to the pressure tank, wherein a storage tank outlet is disposed vertically above a pressure tank inlet disposed at an uppermost extent of the pressure tank;
    urging a volume of air from an air source into the first pressure tank to pressurize the first pressure tank to a second pressure greater than the first pressure when the storage output valve is in a closed position;
    releasing a flow of water from the first pressure tank via a pressure tank output line fluidly connected to the first pressure tank; and
    selectably venting pressure from the pressure tank via a vent line operably connected to the pressure tank to allow for refilling of the pressure tank from the water storage tank when the storage output valve is opened.

13. The method of claim 12, further comprising:
    detecting a water level at the first pressure tank; and
    refilling the first pressure tank from the water storage tank based on the detected water level.

14. The method of claim 12, further comprising:
    urging a portion of the volume of water from the water storage tank into a second pressure tank arranged in parallel with the first pressure tank;
    urging a volume of air from the air source into the second pressure tank to pressurize the second pressure tank to a second pressure greater than the first pressure; and
    selectably releasing a flow of water from the first pressure tank and/or the second pressure tank via a pressure tank output line fluidly connected to the first pressure tank and the second pressure tank.

15. The method of claim 14, further comprising selectably filling the first pressure tank and/or the second pressure tank from the water storage tank through operation of the storage output valve operably connected to the first pressure tank and the second pressure tank.

16. The method of claim 14, further comprising selectably pressurizing the first pressure tank and/or the second pressure tank through operation of an air valve operably connected to the air source, first pressure tank and second pressure tank.

17. The method of claim 12, further comprising urging water from the water storage tank via a pump.

* * * * *